United States Patent
Wahl et al.

(10) Patent No.: US 10,000,642 B2
(45) Date of Patent: Jun. 19, 2018

(54) LONG WAVE INFRARED TRANSPARENT WINDOW AND COATING MATERIALS

(71) Applicant: RAYTHEON COMPANY, Waltham, MA (US)

(72) Inventors: Joseph M. Wahl, Lexington, MA (US); Richard L. Gentilman, Acton, MA (US); Randall W. Tustison, Andover, MA (US); Christopher S. Nordahl, Chelmsford, MA (US); Huy Q. Nguyen, Dorchester, MA (US); Ralph Korenstein, Framingham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 458 days.

(21) Appl. No.: 14/478,285

(22) Filed: Sep. 5, 2014

(65) Prior Publication Data

US 2016/0068686 A1    Mar. 10, 2016

(51) Int. Cl.
*F21V 9/04*    (2018.01)
*C09D 5/08*    (2006.01)
*G02B 1/10*    (2015.01)

(52) U.S. Cl.
CPC ............... *C09D 5/08* (2013.01); *G02B 1/10* (2013.01)

(58) Field of Classification Search
USPC ....... 244/3.16; 501/1, 152, 153, 87; 252/587
See application file for complete search history.

(56) References Cited

U.S. PATENT DOCUMENTS

| | | | |
|---|---|---|---|
| 4,907,846 A | 3/1990 | Tustison et al. | |
| 4,995,684 A | 2/1991 | Tustison et al. | |
| 5,120,602 A | 6/1992 | Tustison et al. | |
| 9,064,625 B2 * | 6/2015 | Liu | H01F 7/021 |
| 2008/0128931 A1 | 6/2008 | Hsieh et al. | |
| 2011/0315808 A1 * | 12/2011 | Zelinski | B82Y 20/00 244/3.16 |

* cited by examiner

*Primary Examiner* — Monique Peets
(74) *Attorney, Agent, or Firm* — Lando & Anastasi, LLP

(57) ABSTRACT

Systems and method for forming a nanocomposite material. One example of a nanocomposite material includes a first sulfur-based nanoparticle material defining a first nanophase and a second sulfur-based nanoparticle material defining a second nanophase, wherein the nanocomposite material is at least partially long-wave infrared (LWIR) transmitting, and the first nanophase and the second nanophase are co-dispersed to form interpenetrating networks with one another and each has a grain structure that is distinct from one another.

8 Claims, 11 Drawing Sheets

O.M. Aliev, K.A. Aliev, and S.M. Gradzhiev,
"Reactions in ZnS–Sm2S3† and Zn–Sm2S3†Systems",
*Russian Journal of Inorganic Chemistry*, 36, 1476 (1991).

| Material | M.W. | Crystalline form | Appearance | Refractive Index | Refractive Index | Space Group | Density | Knoop Hardness (kg/mm²) | M.P. °C | Solubility in Water |
|---|---|---|---|---|---|---|---|---|---|---|
| ZrS2 | 155.35 | Rhombohedral | Red-Brown | 1.923-2.015 | | P-3m1 | 3.82 | | 1480/1550 | insoluble |
| GeS2 | 136.77 | Monoclinic | White Translucent | 1.95-2.15 (est.) | | Pc | 2.94 | | 800 | slight |
| CaS | 72.14 | Cubic | Colorless | 2.137 | | Fm3m | 2.59 | | 2525 | |
| Y2S3 | 274.0 | Cubic | Yellow | 2.16-2.36 (est.) | | | 3.87 | | 1925 | decomposes |
| MgS | 56.4 | Cubic | Red | 2.271 | | Fm-3m | 2.68 | | >2000 | insoluble |
| ZnS (CVD) | 97.5 | Cubic | Yellow | 2.2907 (1um) | 2.201 (10um) | F-43m | 4.09 | 128-276 | 1185 | |
| Ga2S3 | 235.6 | Monoclinic | Yellow (cr) or White (amor) | 2.22-2.42 (est.) | | | 3.63 | | 1255 | decomposes |
| ZnS (MS) | 97.5 | Cubic | Colorless | 2.3884 (0.55um) | 2.1710 (12um) | F-43m | 4.09 | 128-276 | 1185 | insoluble |
| CaLa2S4 | 446.1 | | | ~2.4 | | | | | | |
| DyS | 194.6 | | | | | | 6.08 | | | |
| Dy2S3 | 421.2 | | | | | | 6.53 | | | |
| GaS | 101.8 | Hexagonal | Yellow | 2.628 (1um) | 2.516 (10um) | P6₃/mmc | 3.86 | | 965 | insoluble |
| GdS | 189.3 | | | | | | 6.1 | | | |
| Gd2S3 | 410.7 | | Red-Brown | | | Pnma | 5.75 | | 1900 | |
| LaS | 171.0 | Cubic | Gold | | | | 4.911 | | | |
| La2S3 | 374.0 | Cubic | Red or Yellow (cr) | | | Pnma | 4.77 | | 2750 | decomposes |
| LaS2 | 203.0 | Orthorombic | Yellow Brown | | | Pnma | 4.1 | | d>620 | |
| Y5S7 | 669.0 | Monoclinic | | | | C12/m1 | | | 1630 | |
| ZnGa2S4 | 333.1 | Tetragonal | | | | | 3.81 | | 1218-1278 | |

FIG. 3

LONG WAVE INFRARED TRANSPARENT WINDOW AND COATING MATERIALS

BACKGROUND

Optical imaging systems generally include one or more externally mounted optical elements which shield the remainder of the imaging system from an external environment. For example, with infrared (IR) airborne imaging systems, an IR transparent optical element such as a window or dome is generally mounted on the airborne system to isolate the remainder of the IR imaging system from exposure to humid, corrosive, and/or abrasive environments. Prolonged exposure to these environments generally degrades the optical and physical characteristics of the material of the external optical element. In certain instances the most severe environmental exposure encountered by such external optical elements is high velocity water droplet impact that occurs when an airborne system is flown through a rain field. In addition, external optical elements are harmed by dust particles, such as sand, which may occur in desert environments.

In general, exposure to water droplet impact is referred to as rain erosion. During flight through a rain field, water droplets from a rain field impinge upon the surface of the external element producing subsurface fractures even at subsonic velocities. For very brittle materials, these subsurface fractures are initiated at pre-existing microflaws lying near or at the surface of the optical element. Rain erosion damage to such optical elements occurs prior to any significant removal of material. The mere propagation of these pre-existing microflaws is sufficient to damage the optical element. In particular, these microflaws are propagated through the optical element by the tensile component of a surface stress wave created at the time of impact with the water droplet. Once formed, the continued propagation of a subsurface fracture through the optical element will often produce large cracks in the optical element. In the region of the cracks, scattering and refraction of incident IR energy will occur that ends up producing increased internal reflections and IR energy losses. With a significant number of such cracks, the transmissivity of the optical element is severely reduced. Furthermore, as cracks propagate through the optical element, catastrophic failure of the element may occur. When the optical element shatters or breaks, the remaining optical elements of the IR imaging system are exposed to the external environment, resulting in potential catastrophic damage to the imaging system. Similar types of problems may also be caused by abrasion from sand particles. Even further, for airborne systems such as aircraft or missiles, damage to the window or dome may cause loss of control of the airborne system, which may be catastrophic.

Non-limiting examples of materials which offer the best mechanical durability and optical performance for infrared imaging systems, such as long wavelength infrared (LWIR) energy in the 8.0 micron to 12.0 micron infrared band, include zinc sulfide (ZnS), zinc selenide (ZnSe), germanium (Ge), gallium arsenide (GaAs), gallium phosphide (GaP), mercury cadmium telluride (HgCdTe), and cadmium telluride (CdTe). However, these materials are relatively brittle and have a relatively low resistance to damage, particularly damage sustained during high velocity impact from water droplets and dust particles, such as sand. For example, ZnS and ZnSe are relatively soft and lack durability when they are exposed to severe environmental conditions. To further complicate matters, coating materials that are hard may also be more absorbing, in particular at LWIR wavelengths. In addition, rain enhanced protective (REP) ZnS coatings deposited using radio frequency (RF) magnetron sputtering result in highly compressive stressed films that tend to delaminate from the base material during impact.

Optical energy incident upon a surface of an optical element results in reflection of the energy at the surface if the index of refraction of the material comprising the optical element is significantly different than the index of refraction of the medium from which the energy originates. Generally, for airborne systems, the originating medium is air having an index of refraction of about one. Accordingly, it is desired to provide optical elements and coatings using materials of appropriate refractive index to reduce losses attributed to reflection.

SUMMARY OF THE INVENTION

Aspects and embodiments relate generally to durable long-wave infrared (LWIR) transmitting materials, and more particularly, to multi-phase nanocomposite materials for constructing and shielding optical elements. Certain aspects and embodiments are directed to a combination of two or more LWIR transmitting materials that are mutually insoluble to form nanocomposite materials that exhibit superior resistance to abrasion and erosion caused by high velocity liquid and solid particles, including rain and sand.

According to one embodiment, a nanocomposite material comprises a first sulfur-based nanoparticle material defining a first nanophase, and a second sulfur-based nanoparticle material defining a second nanophase, wherein the nanocomposite material is at least partially long-wave infrared (LWIR) transmitting, and the first nanophase and the second nanophase are co-dispersed to form interpenetrating networks with one another and each has a grain structure that is distinct from one another.

In one example, the first and the second sulfur-based nanoparticle materials are mutually insoluble, and at least one of the first and the second sulfur-based nanoparticle material is insoluble in water. In one example, the first sulfur-based nanoparticle material and the second sulfur-based nanoparticle material form a layer of nanocomposite material having a hardness value that is greater than a hardness value of either the first or the second sulfur-based nanoparticle materials. In another example, the layer of nanocomposite material forms an optical element having a thickness of from about 1 mm to about 25 mm. In another example, the layer of nanocomposite material forms a coating having a thickness of less than about 50 microns. In another example, the coating of nanocomposite material coats a surface of an optical element formed from the nanocomposite material. In one example, the first sulfur-based nanoparticle material is zinc sulfide (ZnS). In one example, the second sulfur-based nanoparticle material is Calcium Lanthanum Sulfide (CLS). In one example, the second sulfur-based nanoparticle material is yttrium sulfide ($Y_2S_3$). In one example, the volume ratio of the first sulfur-based nanoparticle material to the second sulfur-based nanoparticle material is in a range of about 10:90 to about 90:10.

According to another embodiment, a method of forming a nanocomposite material comprises combining a plurality of nanoparticles of a first sulfur-based material with a plurality of nanoparticles of a second sulfur-based material such that the plurality of nanoparticles of the first sulfur-based material define a first nanophase, and the plurality of nanoparticles of the second sulfur-based material define a second nanophase, and using the combination of the plurality of nanoparticles of the first sulfur-based material and the plurality of nanoparticles of the second sulfur-based material to produce a layer of the nanocomposite material, wherein the layer of nanocomposite material is at least partially LWIR transmitting, and the first nanophase and the second nanophase are co-dispersed to form interpenetrating networks with one another and each has a grain structure that is distinct from one another.

In one example, the layer of nanocomposite material has a hardness value that is greater than a hardness value of either the hardness value of the nanoparticles of the plurality of the first sulfur-based material and the hardness value of the nanoparticles of the plurality of the second sulfur-based material. In one example, the plurality of nanoparticles of the first and the second sulfur-based materials are mutually insoluble and at least one of the plurality of nanoparticles of the first and the second sulfur-based material is insoluble in water. In one example, combining includes uniformly mixing and isostatically pressing the plurality of nanoparticles of the first and the second sulfur-based materials such that the layer of nanocomposite material forms an optical element having a thickness of from about 1 mm to about 25 mm. In one example, combining includes sputtering the plurality of nanoparticles of the first sulfur-based material with the plurality of nanoparticles of the second sulfur-based material such that the layer of nanocomposite material forms a coating having a thickness of less than about 50 microns. In another example, combining to form the coating includes coating a surface of an optical element formed from the nanocomposite material. In another example, the plurality of nanoparticles of the first sulfur-based material are ZnS, and the plurality of nanoparticles of the second sulfur-based material are CLS or $Y_2S_3$. In one example, the volume ratio of the plurality of nanoparticles of the first sulfur-based material to the plurality of nanoparticles of the second sulfur-based material is in a range of about 10:90 to about 90:10.

According to another embodiment, an optical element formed of a nanocomposite material comprises a first sulfur-based nanoparticle material defining a first nanophase, and a second sulfur-based nanoparticle material defining a second nanophase, wherein the nanocomposite material is at least partially long-wave infrared (LWIR) transmitting, and the first nanophase and the second nanophase are co-dispersed to form interpenetrating networks with one another and each has a grain structure that is distinct from one another.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 3 is a table of candidate nanocomposite components according to aspects of the invention;

DETAILED DESCRIPTION

Figure 1:
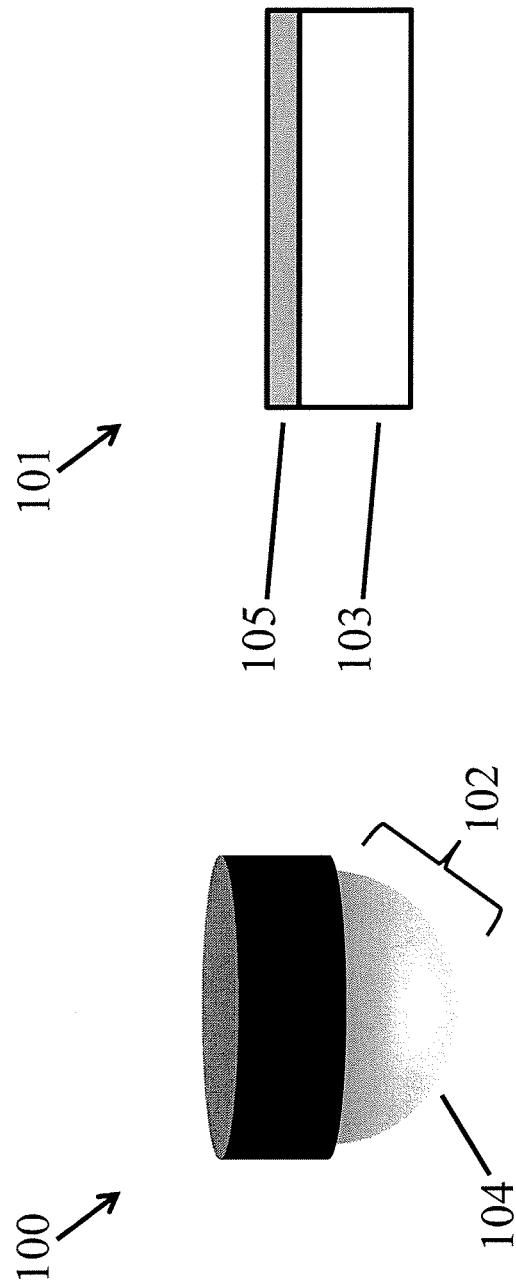
FIGS. 1A and 1B are side views of optical elements according to aspects of the invention.

By way of introduction, aspects and embodiments relate to systems and methods for providing nanocomposite materials possessing LWIR transmitting capabilities and superior physical properties rendering them capable of withstanding exposure to severe environmental conditions. In some embodiments, the nanocomposite material is used to construct optical elements, such as windows. In other embodiments, the nanocomposite material is used as a nanocomposite coating that is suitable for protecting optical elements from environmental exposure. As used herein, the term "nanocomposite" refers to a multi-phase composite material comprising a mixture of two or more nanoparticle materials. As discussed further below, according to various embodiments, the two or more nanoparticle materials are mutually insoluble and therefore form a multi-phase structure that exhibits superior physical properties when compared to the physical properties of the individual parent materials. The nanocomposite materials disclosed herein show superior resistance to sand and rain erosion, thereby extending the lifetime of LWIR windows and domes.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, the acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Optical Element

According to at least one embodiment, an optical element is provided that is constructed from one or more nanocomposite materials. Referring to FIG. 1A, an optical element, generally indicated at 100, is shown that includes a dome 102 suitable for use on an exterior surface of an aircraft, satellite, or missile. The dome 102 comprises a nanocomposite material 104 as discussed further below. Although the optical element in FIG. 1A features a dome, it is appreciated that other types of optical elements having different sizes and shapes, such as plates, windows, lenses, etc., may alternately be substituted for the dome 102. Depending on the specific application and the type of materials used, the nanocomposite material 104 used to construct the optical element 100 may have a thickness in a range of about 1 mm to about 25 mm. According to at least one embodiment, the nanocomposite may have a grain size of about 1 micron to about 10 microns.

Coating

According to another embodiment, a nanocomposite coating is provided that may be used to cover at least a portion of an optical element, such as a window, dome, lens, etc. used for aerospace or industrial applications. Referring to FIG. 1B, an optical element, generally indicated at 101, is shown that includes a substrate 103, and at least one layer of a nanocomposite coating material 105, as discussed further below. The substrate 103 shown in FIG. 1B is planar in shape, but other shapes, such as the dome 102 in FIG. 1A are also possible, depending on the specific application. A single layer of the nanocomposite coating 105 may be used, or in some instances, multiple coatings may be used. Further, the thickness of the nanocomposite coating material varies with the type of specific application. According to some embodiments, the thickness of the nanocomposite coating may be less than about 50 microns. According to other embodiments, the thickness of the nanocomposite coating may be in a range of about 15 microns to about 25 microns. In accordance with other embodiments, the thickness of the nanocomposite coating may be less than 1 micron. The nanocomposite coating may be any thickness that is suitable for the purposes of performing a protective function as described in the methods and systems disclosed herein.

According to a further embodiment, the substrate 103 of FIG. 1B may comprise a nanocomposite material as disclosed herein. For example, the substrate 103 may comprise a first nanocomposite material and the nanocomposite coating material 105 may comprise a second nanocomposite material. Even further, both the substrate 103 and the coating 105 may comprise the same nanocomposite material. In certain instances, this may be advantageous, since the substrate and coating have matching refractive indices and material properties, thereby enhancing their ability to bond with one another and reduce light scatter at their interface.

Properties of Candidate Nanocomposite Materials

According to one or more embodiments, a nanocomposite material is provided that comprises two or more nanoparticle materials. As used herein, the term "nanoparticle" refers to particles having a diameter of less than 500 microns. The nanoparticle may be of any shape, including spherical shapes having crystalline structures, such as those listed in FIG. 3, as well as other shapes, such as platelets, whiskers, fibers, etc. The nanoparticles may be a compound comprising one or more elements. For example, at least one element of the nanoparticle material may be sulfur (S), and thus may be referred to herein as a sulfur-based nanoparticle. Further, nanocomposite materials that include at least one sulfur-based compound may be referred to herein as a sulfur-based nanocomposite. As used herein, the term "sulfur-based" also refers to sulfides or sulfates, depending on the chemical composition of the nanoparticle or nanocomposite.

According to a further aspect, the nanoparticle materials are at least partially LWIR transmitting. As used herein, LWIR refers to long-wave infrared radiation in the range of 8.0 microns to 12.0 microns ($\lambda$=8-12 $\mu$m).

In accordance with some embodiments, the nanoparticle materials may have a refractive index that is compatible with a substrate material, such as in applications where the nanocomposite material is used to coat an optical element. Further, in embodiments where the nanocomposite material comprises one or more nanoparticle materials, each nanoparticle material used in the nanocomposite may have a refractive index that is similar in value to the other nanoparticle materials used in the nanocomposite. For example, the nanoparticle materials used in a nanocomposite coating or optical element may possess refractive indices that are very close in value to one another. This ensures that the materials are optically compatible, thereby minimizing any loss of optical information transmitted through the coating and/or optical element.

According to a further aspect, when the nanoparticle materials are incorporated into a nanocomposite material, the resulting hardness of the nanocomposite material is greater than the hardness of either of the starting nanoparticle materials, thereby resulting in enhanced resistance to abrasive and environmental forces. As mentioned above, at least one of the nanoparticles may be sulfur-based. In general, sulfides are harder than selenides and tellurides. Thus, certain aspects disclosed herein are directed toward sulfide-based materials.

According to some embodiments, the two or more nanoparticle materials comprising the nanocomposite are mutually insoluble. As used herein, the term "mutually insoluble" refers to a combination of two or more nanoparticle materials that do not form a single phase of a solid. For example, according to one embodiment, a two-phase grain structure remains distinct, even after full processing is achieved such that there is distinct phase separation between the two constituents. According to certain aspects, the two phases are generated simultaneously (based on the thermodynamics of the system during processing) and form interpenetrating networks with one another. Each phase of the multi-phase structure may be a nanophase, otherwise referred to herein as a nanoscale phase. As used herein, the terms "nanophase" or "nanoscale phase" refer to a solid phase where at least one dimension is substantially less than 1 micron. For example, each phase of the multi-phase structure is nanoscale in size, i.e., no more than tens of nanometers. Without being bound by theory, it is hypothesized that the multi-phase structure of the nanocomposite material provides physical properties related to hardness and durability. According to some aspects, certain processing conditions may be used to ensure that nanoscale phases are preserved during processing. For example, low deposition temperatures may be used during processing, thereby allowing one or more of the nanophases to remain small. Specific processing conditions are dependent on the type of material being used and the specific targeted application, but in general terms, temperatures, pressures, and processing times are kept low enough to prevent rapid grain growth. Several examples of suitable processing methods are discussed further below.

According to at least one embodiment, a nanocomposite material may comprise a nanoparticle material that is insoluble in water. This may be of particular importance when the intended use for the optical element includes exposure to water. In such instances, at least one component of the nanocomposite must be insoluble and stable in water. According to a further embodiment, a nanoparticle material may comprise a first nanoparticle material that is soluble in water, and a second nanoparticle that is insoluble in water. In specific instances, this describes nanoparticle materials that are mutually insoluble.

As discussed herein, metal sulfide powders such as ZnS are useful as precursors for the optical ceramics used in optical elements, including sensor windows and domes. ZnS and ZnSe are also two examples of LWIR transmitting materials. However, these materials typically lack the requisite durability to withstand sustained exposure to harsh environmental conditions. According to one or more embodiments, using sulfide-based nanoparticle materials, such as ZnS, in combination with other nanoparticle materials, produces a durable nanocomposite material that is suitable for harsh field conditions, such as those experienced during aerospace and desert operations.

Figure 2:
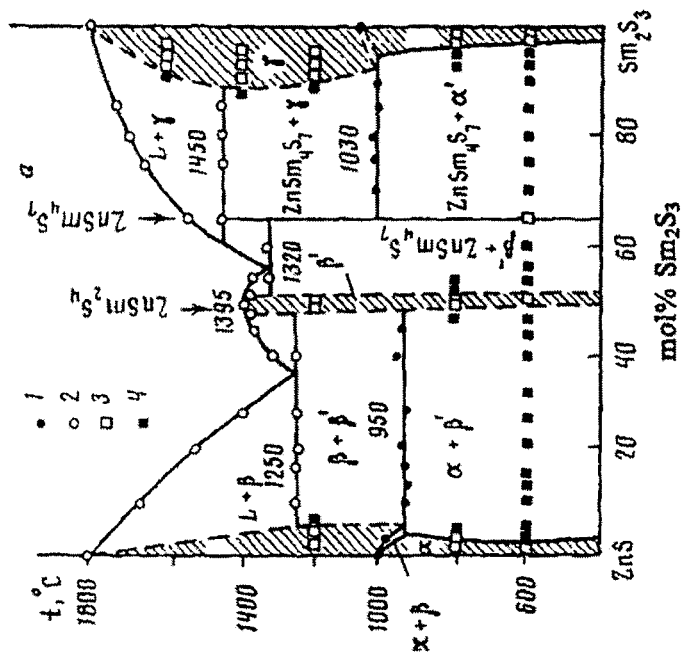
FIG. 2 is a phase diagram of a $ZnS$—$Sm_2S_3$ system according to aspects of the invention.

FIG. 2 is a graph showing a phase diagram of a ZnS—$Sm_2S_3$ (samarium sulfide) system (O. M. Aliev, K. A. Aliev, and S. M. Gradzhiev, "Reactions in ZnS—$Sm_2S_3$ and $Sm_2S_3$ Systems," *Russian Journal of Inorganic Chemistry*, 36 p. 1476 (1991)). As shown, the eutectic compositions and temperatures are 37 and 56 mol. % $Sm_2S_3$ and 1250° C. and 1320° C., respectively. $ZnSm_2S_4$ and $ZnSm_4S_7$ are formed in this system. $ZnSm_2S_4$ melts congruently at 1395° C. and $ZnSm_4S_7$ melts incongruently at 1450° C. 1:1 (spinel) and 1:2 compounds are common to many MeS-$RE_2S_3$ systems, where Me represents a metal sulfide, and $RE_2S_3$ represents a rare earth sesquisulfide, such as samarium or yttrium. According to certain aspects, it is predicted that ZnS—$Y_2S_3$ should behave in a similar manner as the ZnS—$Sm_2S_3$ system shown in FIG. 2, with the two regions of interest including the ZnS—Zn(Sm or Y)$_2S_4$ region and the Zn(Sm or Y)$_2S_4$—Zn(Sm or Y)$_4S_7$ region. As appreciated, the kinetics of the reactions may influence the phases actually present in the resulting composite material.

A list of potential sulfide-based nanocomposite candidate materials that are capable of forming second phases for the development of sulfur-based nanocomposite materials, and particularly, ZnS-based nanocomposite material, are shown in Table 1. A full list of potential sulfide materials and their physical properties are shown in FIG. 3. The refractive indices shown in FIG. 3 reflect values obtained for the LWIR range. The refractive index estimates shown in Table 1 and FIG. 3 are the oxide values plus 0.3-0.5.

TABLE 1

Nanocomposite Candidate Materials

| Material | Crystalline Form | Refractive Index | Space Group | Knoop Hardness ($kg/mm^2$) | Melting Point (° C.) | Solubility in water |
|---|---|---|---|---|---|---|
| CaS | Cubic | 2.137 | Fm-3m | | 2525 | Slight |
| $Y_2S_3$ | Cubic | 2.16-2.36 (est.) | | | 1925 | Soluble |
| MgS | Cubic | 2.271 | Fm-3m | | >2000 | Decomposes |
| ZnS (CVD) | Cubic | 2.2907 (1 μm) 2.201 (10 μm) | F-34m | 128-276 | 1185 | Insoluble |
| $Ga_2S_3$ | Monoclinic | 2.22-2.42 (est.) | | | 1255 | Decomposes |
| ZnS (MS) | Cubic | 2.3884 (0.55 μm) 2.1710 (12 μm) | F-43m | 128-276 | 1185 | Insoluble |
| $CaLa_2S_4$ | | ~2.4 | | | | |

Referring to the materials listed in Table 1, calcium sulfide (CaS) is considered less desirable of a candidate than the other listed materials, since the value for the refractive index is not as close to that of ZnS as the other materials. For example, yttrium sulfide ($Y_2S_3$), magnesium sulfide (MgS), gallium sulfide ($Ga_2S_3$), and calcium lanthanum sulfide ($CaLa_2S_4$) have refractive indices that that are close in value to that of ZnS, where Δn is <0.15. Of these materials, both MgS and $Ga_2S_3$ decompose in water, rendering them unsuitable for use in nanocomposite coatings and optical elements exposed to water. Of the remaining materials, both $Y_2S_3$ and $CaLa_2S_4$ represent good candidates for forming a multi-phase nanocomposite material with ZnS, and in fact, each of these materials was combined with ZnS into a nanocomposite material, as discussed below in reference to Examples 1 and 2. Other materials listed in FIG. 3 may provide good candidates as well. For instance, dysprosium sesquisulfide ($Dy_2S_3$) and gadolinium sesquisulfide ($Gd_2S_3$) may also be capable of forming second phases for the development of sulfur-based nanocomposite materials. Other sulfides that may not necessarily be listed in FIG. 3 but may also be suitable candidates include one or more of the rare earth elements.

The relationship between the grain size and the hardness of the material is known as the Hall-Petch (HP) relationship, and according to this relationship, mechanical strength increases as the grain size of the material decreases. The HP relationship holds until the grain size is the same as the equilibrium distance between dislocations in the grain structure. In fact, the Hall-Petch relationship has been shown to break down for some materials with fine enough grain sizes such that the plot exhibits a departure from the linear relationship and in certain instances for very fine grain sizes, takes on a negative slope. For many materials, this transition from grain size strengthening to grain size softening is called the "inverse" Hall-Petch relationship (I-HP) and is observed at the critical grain size. This implies that the mechanical properties are progressively dominated by the behavior of the grain boundaries in their response to stress as opposed to bulk mechanical properties of the grains themselves. For some materials, this "softening" of the material for grain sizes smaller than the critical value has been observed to occur at grain sizes less than 100 nm, and typically in the region of several to a few tens of nanometers. The critical size may be termed as "the point of Hall-Petch departure." Implicit in the observation of empirical Hall-Petch plots, therefore, is that the strongest, hardest version of a particular material will be materials with an average grain size as close as possible to the Hall-Petch departure grain size.

Figure 4:
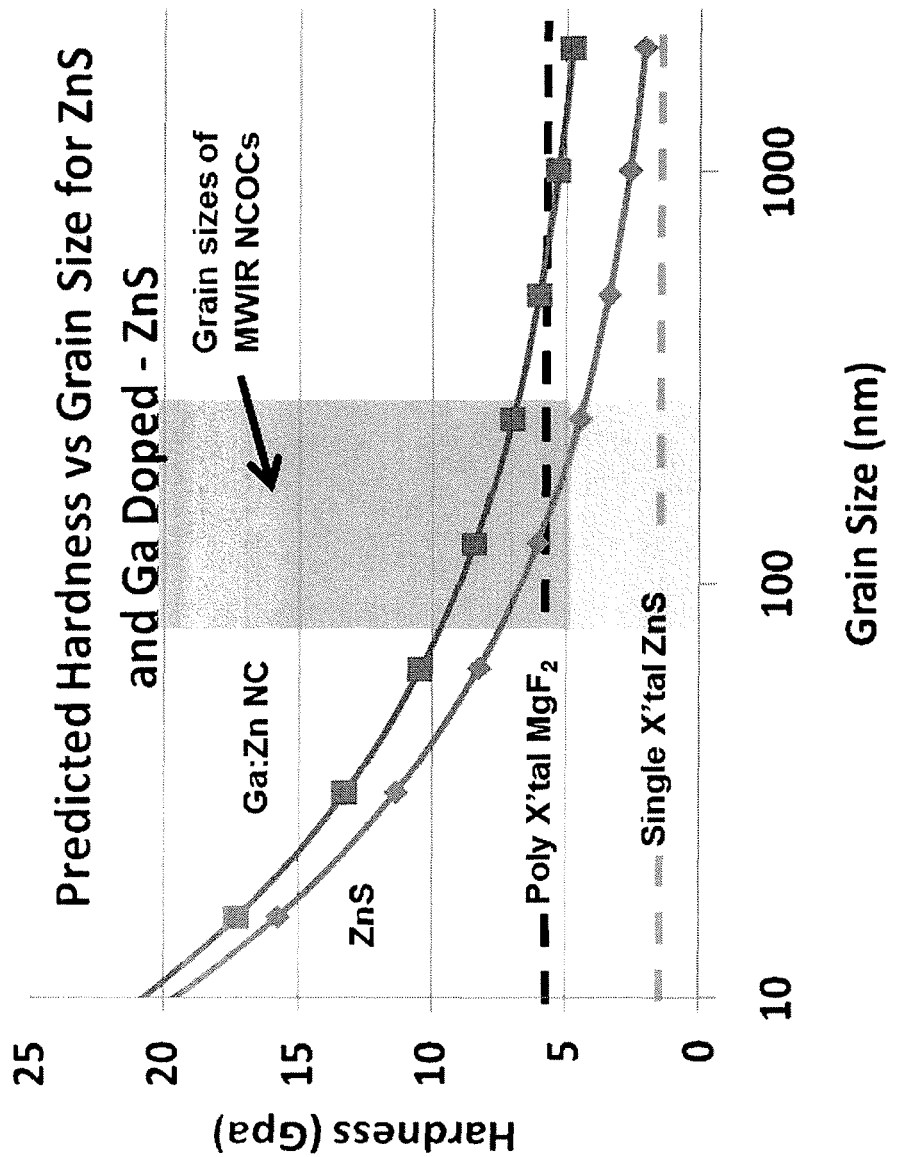
FIG. 4 is a graph showing the relationship between predicted hardness and grain size according to aspects of the invention.

FIG. 4 is a graphical representation of the Hall-Petch relationship and plots the hardness of ZnS and a Ga:ZnS nanocomposite as a function of grain size. The shaded region in FIG. 4 represents the grain sizes of medium-wave infrared radiation (MWIR) in the range of 3.0 microns to 5.0 microns ($\lambda$=3-5 $\mu$m) nanocomposite optical ceramic (NCOC) materials. The critical grain size is about 15 nm, which ensures that the HP effect, and not the I-HP effect, will dominate the material's performance. Generally speaking, the target grain size is less than 100 nm, and in some embodiments, the target grain size is about 50 nm. Further, FIG. 4 illustrates that it can be expected that the hardness of ZnS may be increased to values at about 7.5 GPa through grain size refinement using a nanocomposite approach to fabrication. Ga:Zn nanocomposites are also predicted to have hardness values that are twice as high as those of $MgF_2$, which results in materials that possess substantially better erosion resistance. Further, the hardness of ZnS nanocomposite materials having grain sizes similar to MWIR NCOC materials, e.g., 80 nm, are predicted to be up to five times higher than those of multispectral (MS)—ZnS materials. Multispectral ZnS is a form of chemical vapor deposition (CVD) zinc sulfide (otherwise referred to as CVD ZnS) that is subjected to a post-deposition hot isostatic process. This removes zinc hydrides from the crystal lattice, normalizes crystal structure, and purifies the material, thus creating a virtually clear substrate with high transmission and minimal scatter from 0.4 microns to 12 microns.

According to some embodiments, the nanocomposite material exhibits a Knoop hardness of greater than 600 $kg/mm^2$. According to other embodiments, the nanocomposite material exhibits a hardness of greater than 1000 $kg/mm^2$. According to a further embodiment, the nanocomposite material exhibits a hardness of greater than 1500 $kg/mm^2$ (with a 50 g load). The hardness may vary depending on the materials used, the thickness of the resulting material, and the ratio of nanoparticles used in the nanocomposite. According to a further aspect, the hardness of the nanocomposite material is greater than the hardness of any of the starting nanoparticle materials that comprise the nanocomposite.

Method of Manufacture—Optical Element

According to some embodiments, a method for producing an optical element comprising at least one nanocomposite material is provided. As mentioned above, the optical element may be any optical element, including a window, dome, or lens structure, including the dome 102 shown in FIG. 1A. ZnS has been proven to be a useful precursor for the optical ceramics used in sensor windows and domes on aircraft, satellites, and missiles. ZnS windows have traditionally been prepared by hot pressing ZnS powders, or in an alternative method, by CVD processes. The CVD process may be advantageous since it allows ZnS windows to be fabricated in larger, flat, or curved geometries which readily conform to the shape of an aircraft. As will be appreciated, conventional processing of two-phase sulfide powders require hot pressing with sintering. This results in excessive grain growth that translates into poor mechanical, optical, and thermal properties. At least one method disclosed herein and disclosed below overcomes the poor sintering behavior of covalently bonded sulfide ceramic materials.

Figure 5:
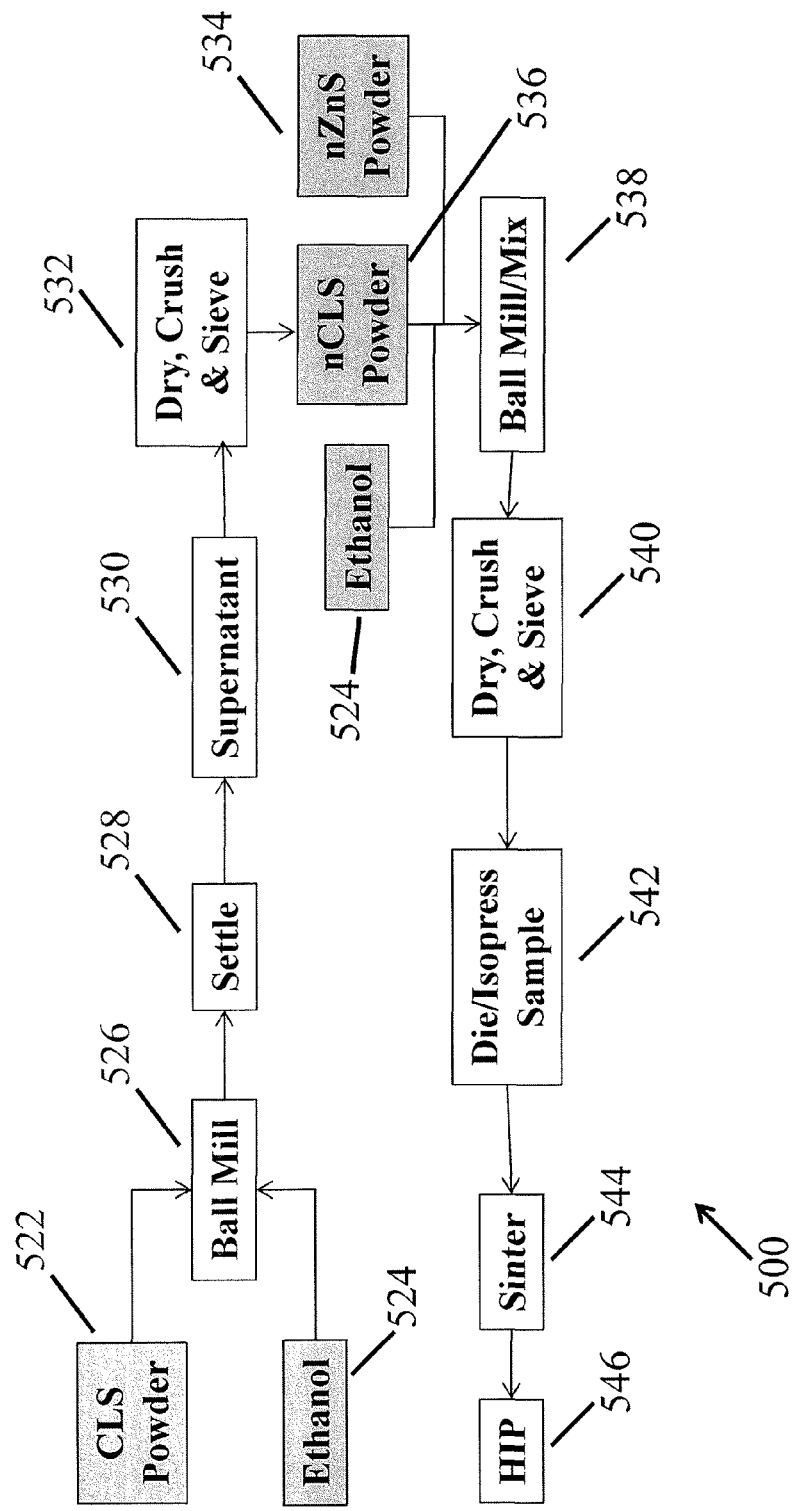
FIG. 5 is a block flow diagram of a processing method according to aspects of the invention.

According to at least one embodiment, a block flow diagram of an example process, generally indicated at 500, for producing a two-phase nanocomposite material is shown in FIG. 5. A first nanoparticle material 522, which in this instance is Calcium Lanthanum Sulfide ($CaLa_2S_4$), or CLS, was first prepared into nanoparticle form through a series of steps indicated at 526-532. Although CLS is used as a specific material in reference to this example process, it is appreciated that one or more other materials, such as one or more of the materials listed above in reference to Table 1 or FIG. 3, may also be used.

The first nanoparticle material 522, was obtained through commercially available sources, such as from Lorad Chemical Corp. (St. Petersburg, Fla.). Specifically, CLS powder having a particle size of about 3 microns was mixed with reagent grade ethanol 524 to form a slurry with approximately 8% CLS powder by volume. According to other examples, methanol or isopropyl alcohol may also be used instead of ethanol. At step 526, the CLS/ethanol mixture was then placed into a jar mill on rollers (Paul O. Abbe, Bensenville, Ill.) with a zirconium dioxide ($ZrO_2$) grinding media (3-5 mm diameter) for a time period of from about 24 hours to about 96 hours. The milling process is based on impact particle size reduction and functions to break up agglomerates of material to produce the nanoparticles. At steps 528 and 530 a settling and separation process was performed where the nano-sized particle fraction of the CLS was separated from the ethanol. For example, at step 528 the CLS/ethanol mixture was allowed to settle and at step 530 the supernatant (nano-sized CLS particles and ethanol) was removed from the CLS milled slurry. In step 532, the ethanol was removed via an evaporation process and the CLS material was dried and crushed, which resulted in nanoscale-sized CLS (otherwise referred to as nCLS) particles. Evaporation and drying was performed using a pan drying process in an oven at 110° F. At this point in the process, the majority of the milled nCLS had a particle size of less than 100 nm, with some particles having a size of about 61 nm. The dried and crushed nCLS powder was also passed through a 100 mesh nylon sieve.

At step 538, the first nanoparticle material 536, which in this example is CLS, and a second nanoparticle material 534, which in this example is ZnS (otherwise referred to as nZnS) were mixed with ethanol 524 in a ball or jar mill, such as the mill used above in step 526, to form a slurry with approximately 8% solids by volume, although according to other examples, a higher solids loading may be used to make the process more efficient. According to this specific example, the milling media consisted of $ZrO_2$, but other milling media is within the scope of this disclosure. For example, low mill wear hard grinding media with high alumina content, such as $Al_2O_3$, may also be used. The first and second nanoparticle materials were mixed thoroughly for about 24-96 hours until a uniform mixture was achieved. Different volume ratios of ZnS to CLS were tested, including 90:10, 80:20, 70:30, and 60:40.

The nZnS material may be obtained through commercially available sources, such as from Texas Biochemicals, Inc. (College Station, Tex.) that ranged in size from about 15 nm to about 300 nm. In alternative embodiments, additional nanoparticle materials may also be added to the nanocomposite mixture at step 538. Thus, three or more nanoparticle materials may be included in the resulting nanocomposite material.

After mixing, the nanocomposite mixture was pan dried in an oven at 110° F. to remove the ethanol, and then crushed and sieved in step 540. For example, the dried and crushed mixture was passed through a 100 mesh nylon sieve. At step 542, the nanocomposite mixture was poured into a die and isopressed. As will be appreciated, the die may take on any form according to the targeted application. For example, the die may form a dome or window structure. In this particular example, the powder was poured into a 12 mm diameter mold and an isostatic pressure of 30,000 psi was applied.

In step 544, the nanocomposite was subjected to pressureless sintering (i.e., at ambient pressure, or without the application of mechanical pressure), which functioned to densify or consolidate the nanocomposite material. The sintering may also be done using a spark plasma sintering (SPS) device at an elevated mechanically applied pressure. According to this specific example, sintering was performed at 1100° C. for 6 hours, and resulted in a density that was greater than 97% of theoretical density. Sintering was followed by hot isostatic pressing (HIP) at step 546, which in this example occurred at a temperature of 990° C. for 12 hours. The process described in FIG. 5 is thus capable of constructing an optical element with a multi-phase LWIR nanocomposite material.

As will be appreciated, the process described above in reference to FIG. 5 may be altered or adjusted according to a specific desired application. For example, different temperatures, pressures, and time periods may apply, depending on the individual nanoparticle materials and the optical element.

In accordance with some methods of fabricating optical elements, two or more nanoparticle materials that comprise the nanocomposite material are uniformly mixed together. For example, referring to FIG. 5, mixing at step 538 may include uniform mixing. As used herein, the term "uniformly mixed" may refer to equally distributed particles, equally spaced particles, or both. In general, uniformly mixed means that each of the nanoparticle materials are individually dispersed in a generally uniform (as measured by their relative spaced) manner. Thus, uniform mixing may be accomplished at the nanoscale level, and in some instances, may be accomplished at the atomic scale. In a non-limiting example, mixing may be performed using a rotating mixing chamber.

According to some embodiments, the nanocomposite material includes two or more nanoparticles materials in equal proportion. For example, 50% of the nanocomposite material by volume is a first nanoparticle material, and the other 50% of the nanocomposite coating is a second nanoparticle material. According to another embodiment, the nanocomposite material includes two or more nanoparticles materials that are in unequal proportions. For example, the first and second nanoparticle materials may be present in a 1:2 ratio. The proportion of each material is dependent on the type of materials and the specific application. For example, some applications may include mixtures of materials that are in a volume ratio ranging from about 20:80 to about 80:20. In other applications, the mixture of materials may be in a volume ratio ranging from about 10:90 to about 90:10. In still other applications, the mixture of materials may be in a volume ratio ranging from about 5:95 to about 95:5. A specific example of a nanocomposite material produced using the process shown in FIG. 5 is discussed below in reference to Example 1.

Method of Manufacture—Coating an Optical Element

Figure 6:
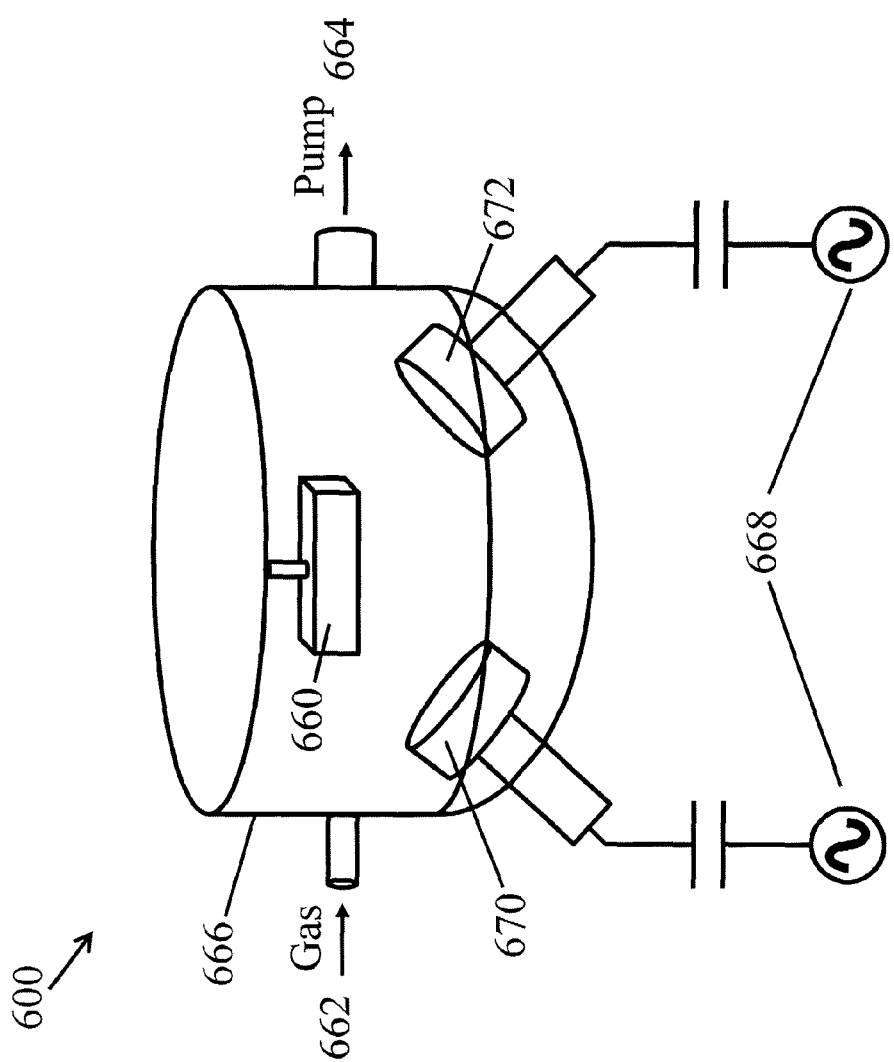
FIG. 6 is a diagram of deposition apparatus according to aspects of the invention.

According to some aspects, a method for coating at least a portion of a surface of an optical element with one or more nanocomposite materials is provided. For example, the optical element may include at least one surface that is at least partially covered by the nanocomposite coating, such as the arrangement shown in FIG. 1B. According to some embodiments, the nanocomposite material may be deposited using a sputtering technique. FIG. 6 illustrates an example of a magnetron RF sputtering device, generally indicated at 600 (adapted from Joung et al. *Nanoscale Research Letters* 2012 7:22) that may be used for such coating applications. The sputtering device 600 includes a chamber 666, one or more targets 670 and 672, an RF power supply 668, and a substrate 660. Each target 670 and 672 includes a source target material species, such as ZnS and $Y_2S_3$, where each material species contributes toward the multi-phase structure of the nanocomposite coating material. The sputtering device 600 featured in FIG. 6 includes two target species, but as will be appreciated, additional target species may be added. During operation, the species from targets 670 and 672 are co-sputtered onto the rotating substrate 660 that is also positioned within the chamber 666 using one or more RF power supplies 668. According to some embodiments, the substrate 660 may be an LWIR transmitting material that is to be at least partially coated with the nanocomposite coating. It will be appreciated that the individual choices for the first and second nanoparticle materials (i.e., target material species 670 and 672) may depend on the type of application and the type of optical element that is being used for a particular application. For example, many optical elements are constructed from ZnS, and therefore having the nanocomposite coating material include ZnS is advantageous, since the respective refractive indices are identical or nearly identical. Thus, according to some embodiments, the substrate may be ZnS, and one of the targets 670 or 672 may also be ZnS. The substrate 660 featured in FIG. 6 is planar in shape, but other shapes within the scope of this disclosure include other optical elements, including domes, windows, and lenses. Sputtering gas 662, such as argon (Ar), enters the chamber 666, which is kept at vacuum using pump 664. As will be appreciated, the compositional ratio of the individual target material species into the resulting nanocomposite coating material may be controlled by through the RF power source(s) 668. Further, the thickness of the coating may also be controlled using process parameters, such as the length of processing time and adjusting the RF power source(s) 668.

A specific example of a nanocomposite coating material produced using a magnetron RF sputtering device shown in FIG. 6 is discussed below in reference to Example 2.

Other methods of coating are also within the scope of this disclosure. For example, ion beam sputtering and CVD techniques may also be used. As mentioned previously, process parameters, including pressure, may be carefully controlled to limit the grain size of the resulting nanocomposite structure.

EXAMPLE 1

ZnS—CLS Composite

Figure 7:
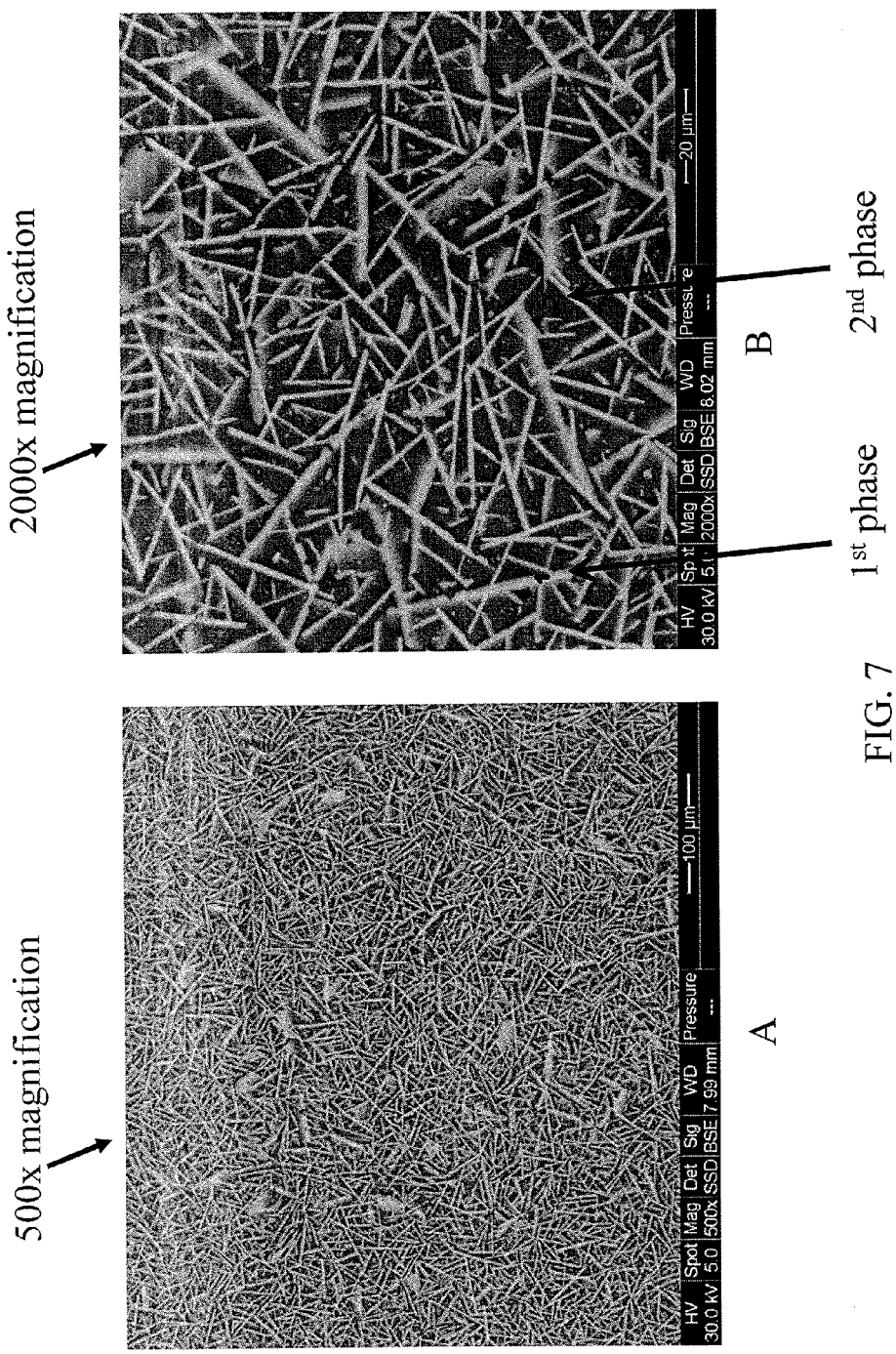
FIG. 7 features two scanning electron microscope (SEM) images of a nanocomposite material according to aspects of the invention.

To construct and test the behavior and physical properties of a two-phase nanocomposite coating material using a first candidate material selected from Table 1 (and FIG. 3) above, ZnS and CLS nanoparticles materials were prepared and combined as discussed above in reference to FIG. 5. Specifically, a mixture of 30% (by volume) CLS was mixed with ZnS to form a nanocomposite material having a thickness of 0.1 mm. A first SEM image, indicated at "A" on the left side of FIG. 7, shows the top surface of the ZnS/CLS nanocomposite material at a magnification of 500×. A second SEM image, indicated at "B," is also featured in FIG. 7, and shows the top surface at a magnification of 2000×. Image "B" also includes a first arrow pointing toward a first phase of the nanocomposite material. As discussed below, the first phase represents the CLS nanoparticle material, and is represented as the white needle structures in FIG. 7. Image "B" also includes a second arrow pointing toward a second phase of the nanocomposite material, which represents the ZnS matrix.

Figure 8:
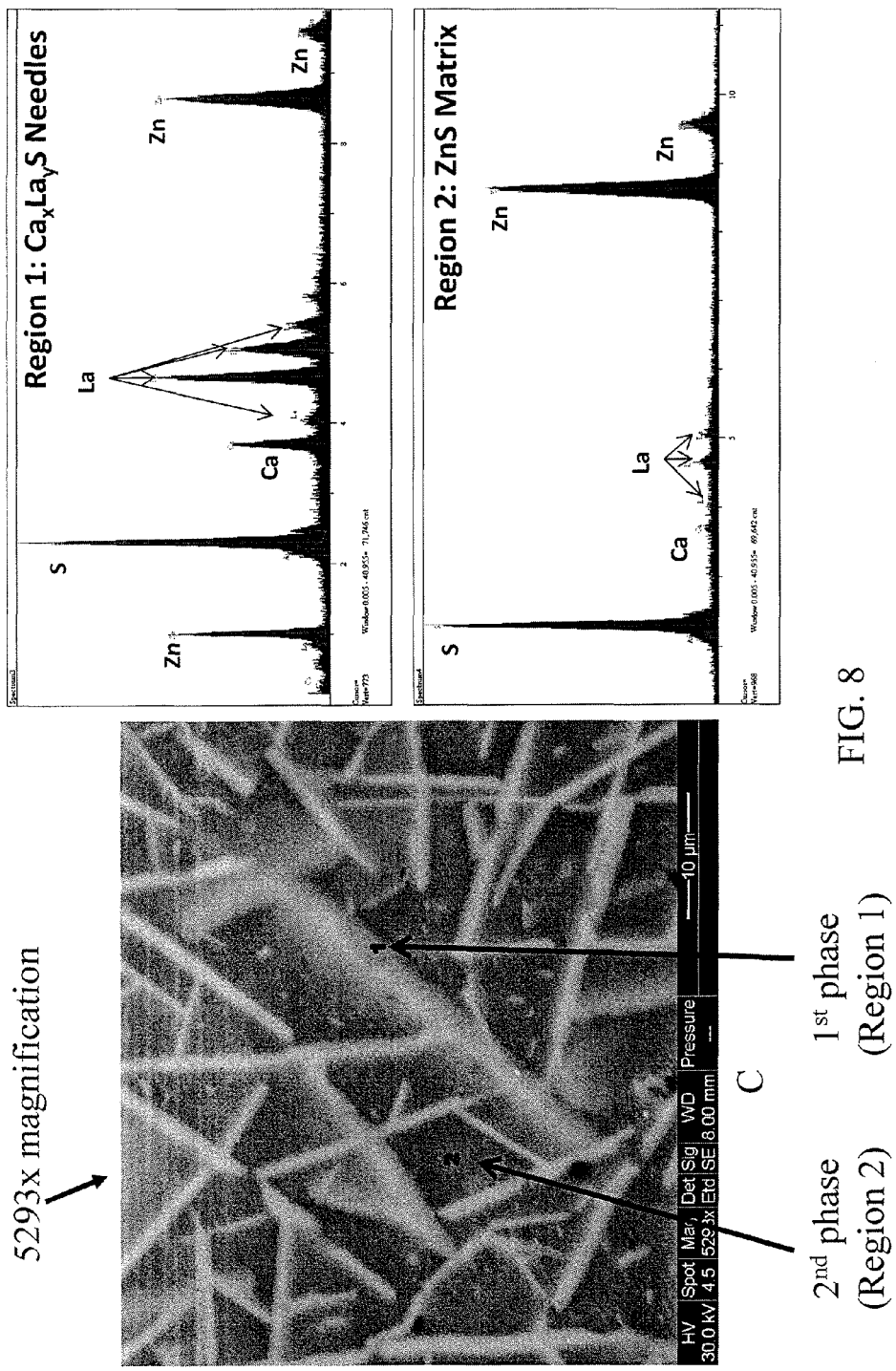
FIG. 8 features a SEM image and two image analysis graphs of a nanocomposite material according to aspects of the invention.

A third SEM image, indicated at "C" is featured on the left side of FIG. 8, and shows the top surface of the nanocomposite material at a magnification of 5293×. As mentioned above, the needle-like CLS structures are labeled as the first phase (i.e., Region 1) and the ZnS matrix region is labeled as the second phase (i.e., Region 2). The top graph on the right side of FIG. 8 shows the energy dispersive X-ray spectroscopy (EDS) taken by the SEM for Region 1 representing the first phase CLS material. Region 1 indicates strong peaks for the Ca, La, and S components of CLS. The bottom graph on the right side of FIG. 8 shows the SEM/EDS information taken for Region 2 representing the second phase ZnS material, and indicates strong peaks for the Zn and S components of ZnS. The image analysis performed above confirms that the nanocomposite material includes two distinct composition regions, and that the nanocomposite material contained about 26% by volume CLS needles.

Figure 9:
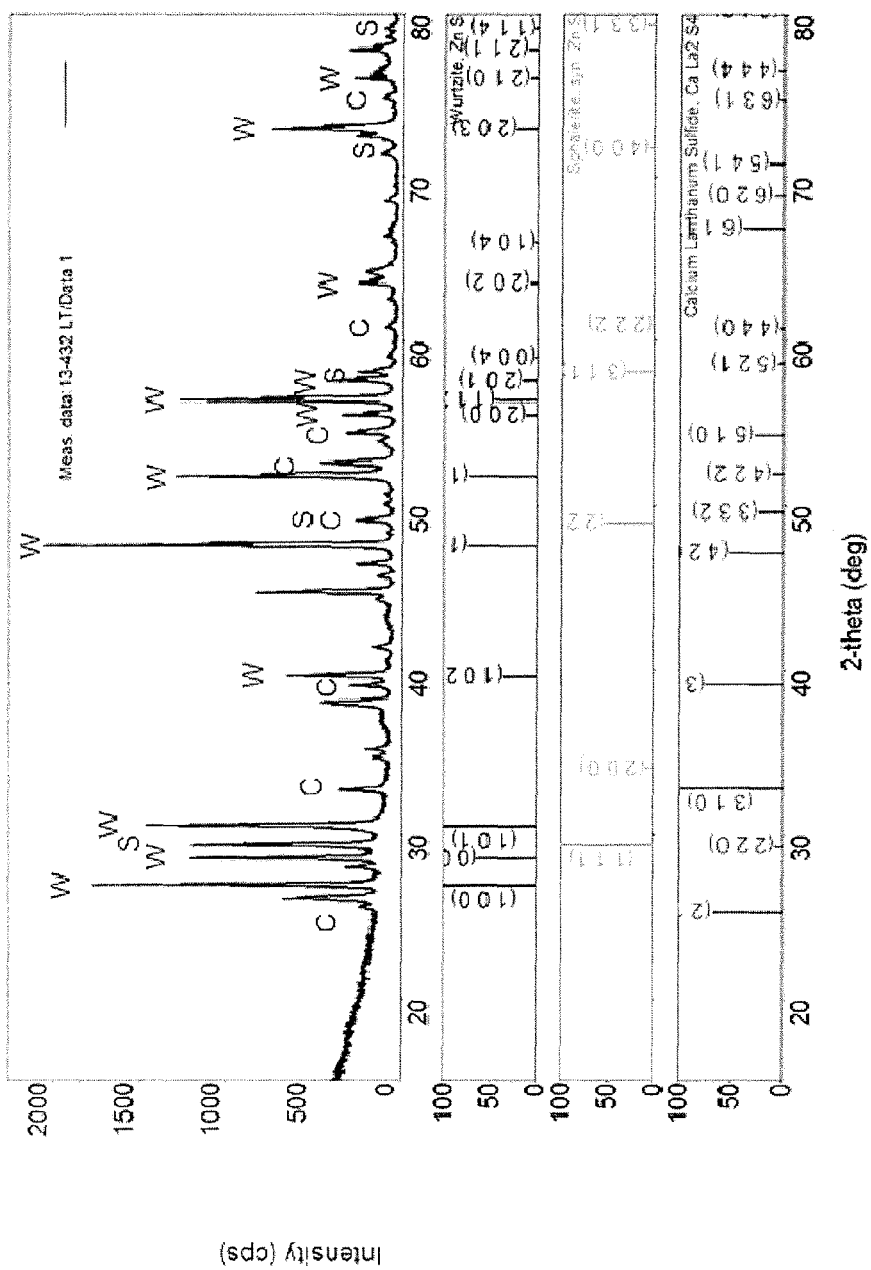
FIG. 9 is an X-ray diffraction (XRD) spectrum of a nanocomposite material according to aspects of the invention.
Figure 10:
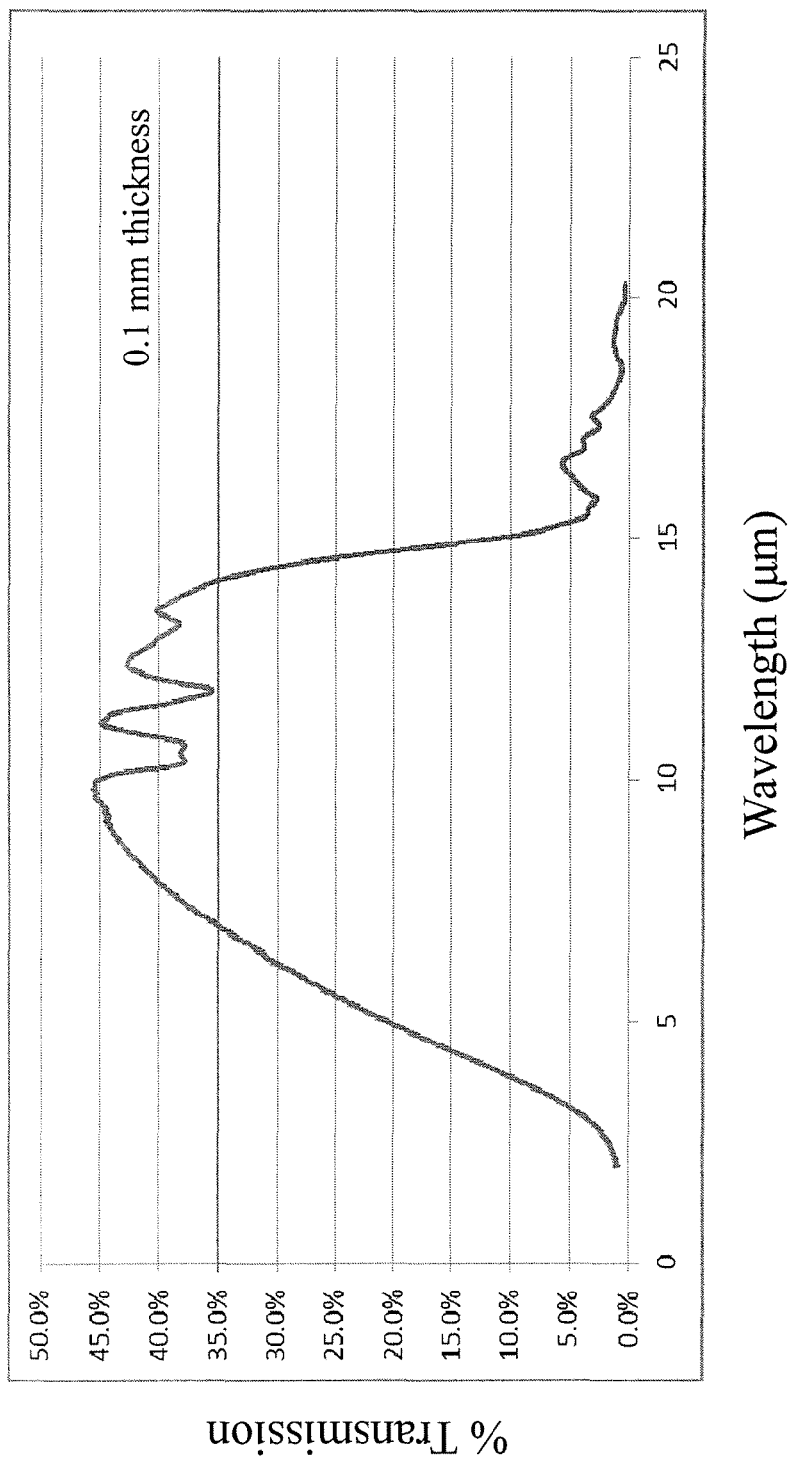
FIG. 10 is a plot of percent transmission versus wavelength for a single layer of nanocomposite material according to aspects of the invention.

Further analysis was performed on the CLS/ZnS nanocomposite material, and the results are shown in FIGS. 9 and 10 and Table 2 below. FIG. 9 is an x-ray diffraction (XRD) spectrum, and FIG. 10 is a plot of percent transmission versus wavelength for the single layer of nanocomposite material. Referring to FIG. 10, it is evident that the nanocomposite material transmits light in the LWIR range of wavelengths, i.e., 8-12 microns.

Table 2 below lists the hardness data for the CLS/ZnS nanocomposite material, as well as that of other related materials, such as MS ZnS and CVD ZnS. The results indicate that the CLS/ZnS nanocomposite material exhibits superior hardness compared to MS-ZnS, CVD ZnS, and single crystal ZnS. For example, the CLS/ZnS nanocomposite material is about 1.4 times harder than MS-ZnS. Thus, the above data indicates that the nanocomposite material improves the mechanical properties of ZnS, without adversely affecting in any significant manner the optical properties, such as refractive index and transmittance.

TABLE 2

Hardness Results

| | CLS-ZnS | MS-ZnS | Single X'tal | CVD ZnS |
|---|---|---|---|---|
| $HK_{25}$ (Knoop Hardness) ($kg/mm^2$) | 226 | 160 | 203 | 217 |
| Grain Size (µm) | 1-10 | 25-50 | — | 2-8 |

EXAMPLE 2

ZnS—$Y_2S_3$ Composite

A second test was performed to test the behavior and physical properties of another two-phase nanocomposite material using a second candidate material selected from Table 1 (and FIG. 3). Specifically, ZnS was co-sputtered with $Y_2S_3$ onto an MS-ZnS substrate having a thickness of 3 mm using an RF magnetron sputtering device, such as the device featured in FIG. 6. The process was performed at 100° C. and a pressure of 3 mTorr using argon (Ar) as the sputtering gas. Several thicknesses and concentrations of $Y_2S_3$ were tested, with the resulting hardness values displayed below in Table 3.

TABLE 3

Hardness Results

| Run Number | Thickness | $Y_2S_3$ Concentration | Knoop Hardness ($kg/mm^2$) |
|---|---|---|---|
| Substrate (MS ZnS) | 3 mm | — | 167 |
| 1 | 42 µm | 0% | 508 |
| 2 | 38 µm | 7% | 593 |
| 3 | 40 µm | 16% | 645 |
| 4 | 35 µm | 20% | 665 |

The results shown in Table 3 indicate that hardness of the nanocomposite coating material increases with increasing yttrium concentration, which establishes that there is improved hardness when ZnS is co-sputtered with $Y_2S_3$ as a second phase. In fact, the hardness increased by over three-fold compared to the MS ZnS substrate (see Table 2), and is as much as 30% harder than conventional ZnS REP coatings.

Figure 11:
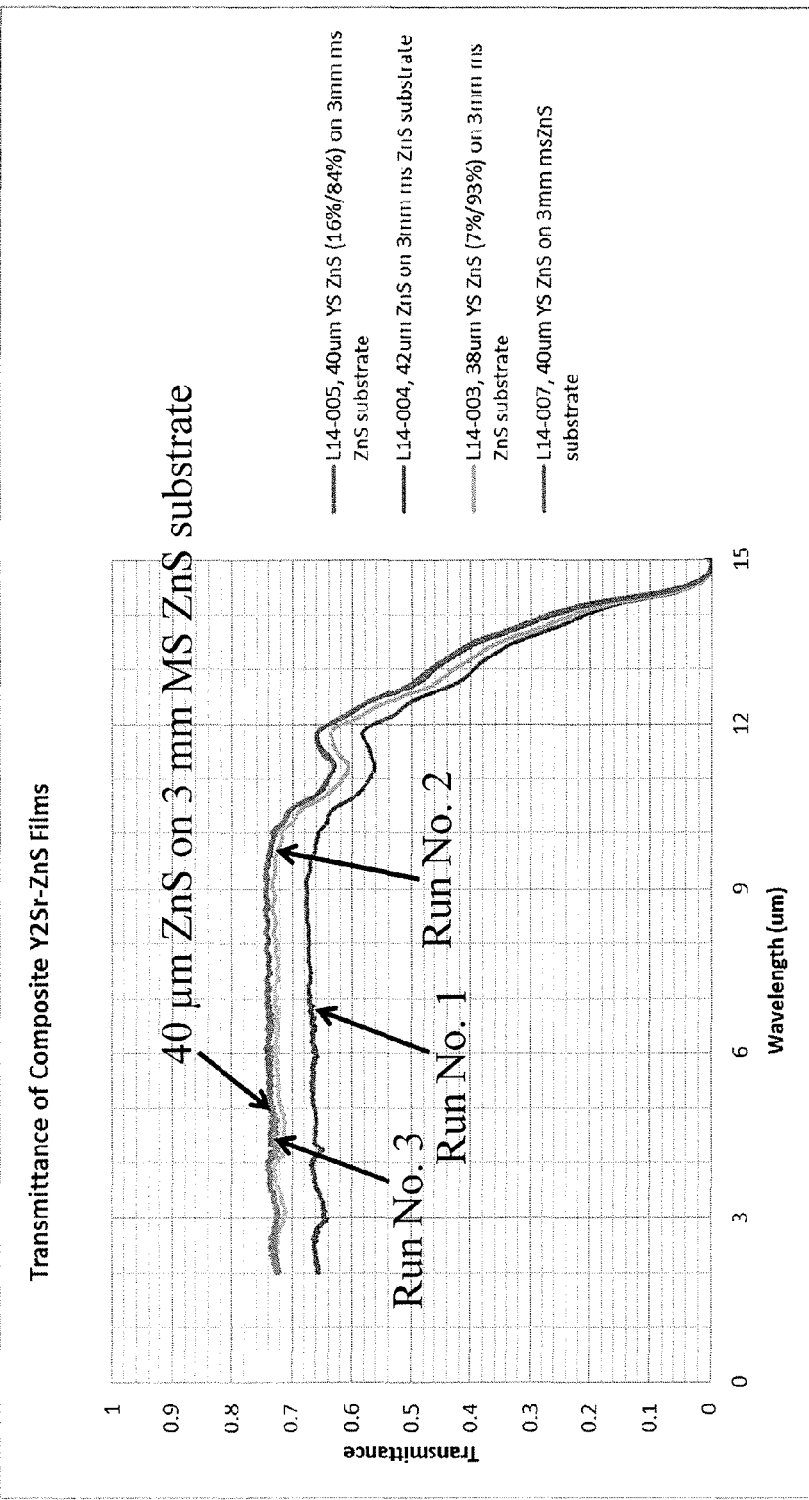
FIG. 11 is a plot of percent transmission versus wavelength for several thicknesses of single layer nanocomposite coating material according to aspects of the invention.

Referring to FIG. 11, the percent transmittance as a function of wavelength for run numbers 1-3 of Table 3 are shown. Also included in FIG. 11 is data from a 40 µm thick layer of ZnS on an MS-ZnS substrate. The results shown in FIG. 11 indicate that the IR transmittance of thick $Y_2S_3$/ZnS films deposited onto a MS-ZnS substrate exhibit little to no reduction in transmittance. This means that materials such as $Y_2S_3$ may be used in nanocomposite coating materials to increase hardness and durability while at the same time preserving the relevant optical properties.

According to at least one embodiment, the nanocomposite materials discussed above may further comprise an anti-reflective coating (ARC) layer such as those typically used in optical devices. For instance, the nanocomposite material may further include an oxide that functions as a durable ARC and further aids in protecting the device. In certain instances, the ARC layer may also function to increase transmittance.

According to certain aspects, the methods and systems described above provide the ability to modify a ZnS based REP coating by forming a nanocomposite coating material using two or more compounds of LWIR transparent nanoparticle materials. The nanocomposite materials described above are transparent to LWIR radiation and function to harden LWIR transparent optical elements like ZnS or ZnSe against damage from high speed raindrop and sand particle impact. In certain embodiments, the nanocomposite material may transmit, during use, at least 75% of the light received. In some embodiments, the nanocomposite may transmit at least 90%, and in other instances may transmit at least 95% of the light received. According to some embodiments where an ARC layer is used, transmittance may approach 100%.

The combination of relatively high hardness and high degree of transparency provides commercial value, since the optical elements last longer and therefore do not need to be replaced as often. The choice of using mixtures of nanoparticle materials that are mutually insoluble in a single nanocomposite material also lends to their increased durability. Further, deposition methods, including sputtering, allow for co-deposition of nanocomposites for a large variety of LWIR transparent materials.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A nanocomposite material comprising:

a first sulfur-based nanoparticle material defining a first nanophase; and a second sulfur-based nanoparticle material defining a second nanophase, wherein the nanocomposite material is at least partially long-wave infrared (LWIR) transmitting, the first nanophase and the second nanophase are co-dispersed to form interpenetrating networks with one another and each has a grain structure that is distinct from one another, and a layer of nanocomposite material formed from the first and the second sulfur-based nanoparticle materials has a Knoop hardness value of at least 600 $kg/mm^2$ that is greater than a hardness value of either the first or the second sulfur-based nanoparticle materials, the layer of nanocomposite material forming a coating having a thickness of less than about 50 microns and coating a surface of an optical element formed from the nanocomposite material.

2. The nanocomposite material of claim 1, wherein the first and the second sulfur-based nanoparticle materials are mutually insoluble, and at least one of the first and the second sulfur-based nanoparticle material is insoluble in water.

3. The nanocomposite material of claim 1, wherein the optical element has a thickness of from about 1 mm to about 25 mm.

4. The nanocomposite material of claim 1, wherein the first sulfur-based nanoparticle material is zinc sulfide (ZnS).

5. The nanocomposite material of claim 4, wherein the second sulfur-based nanoparticle material is Calcium Lanthanum Sulfide (CLS).

6. The nanocomposite material of claim 4, wherein the second sulfur-based nanoparticle material is yttrium sulfide ($Y_2S_3$).

7. The nanocomposite material of claim 1, wherein the volume ratio of the first sulfur-based nanoparticle material to the second sulfur-based nanoparticle material is in a range of about 10:90 to about 90:10.

8. An optical element comprising:

a body formed of a nanocomposite material, the nanocomposite material including:

a first sulfur-based nanoparticle material defining a first nanophase; and a second sulfur-based nanoparticle material defining a second nanophase, wherein the nanocomposite material is at least partially long-wave infrared (LWIR) transmitting, the first nanophase and the second nanophase are co-dispersed to form interpenetrating networks with one another and each has a grain structure that is distinct from one another, and the nanocomposite material has a Knoop hardness value of at least 600 $kg/mm^2$ that is greater than a hardness value of either the first or the second sulfur-based nanoparticle; and a coating formed from the nanocomposite material covering at least a portion of a surface of the body formed of the nanocomposite material and having a thickness of less than about 50 microns.

* * * * *